M. PAULSEN.
TIMBER GAGE.
APPLICATION FILED AUG. 16, 1915, RENEWED APR. 1, 1919.
1,305,562.
Patented June 3, 1919.
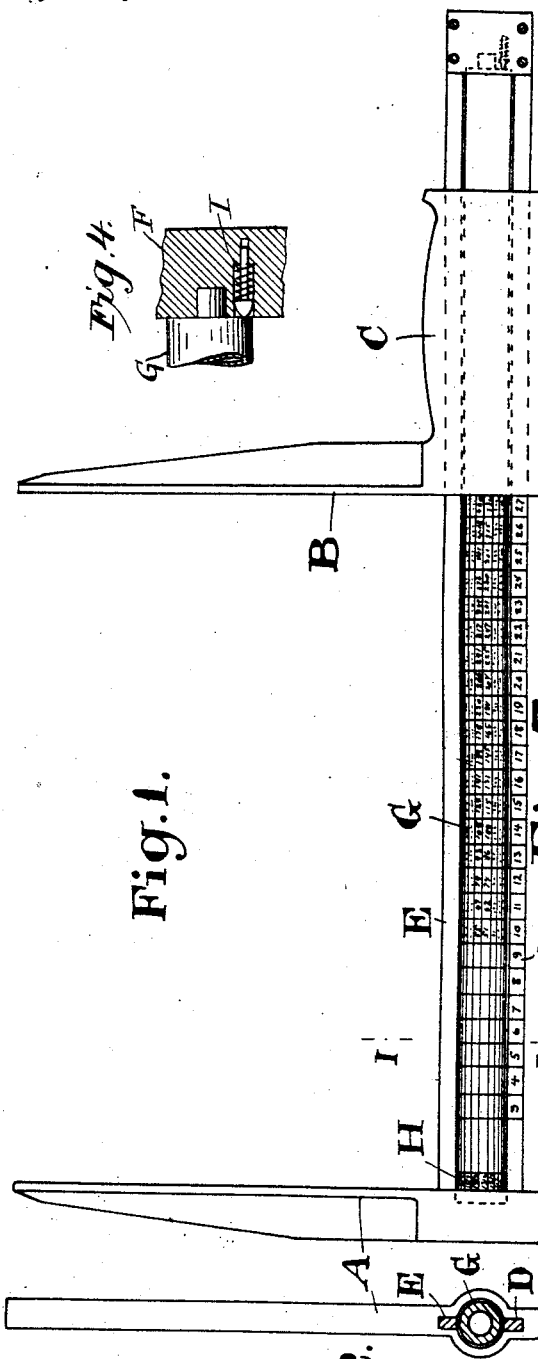
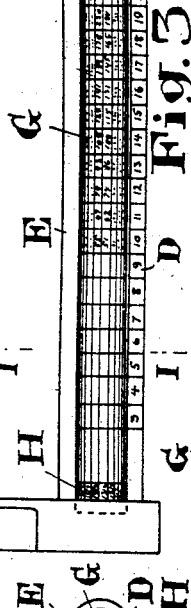
Inventor
Magnus Paulsen,
By [signature]
Atty

UNITED STATES PATENT OFFICE.

MAGNUS PAULSEN, OF ELVERUM, NORWAY.

TIMBER-GAGE.

1,305,562.　　　Specification of Letters Patent.　　Patented June 3, 1919.

Application filed August 16, 1915, Serial No. 45,754. Renewed April 1, 1919. Serial No. 286,800½.

*To all whom it may concern:*

Be it known that I, MAGNUS PAULSEN, a subject of the King of Norway, residing at Elverum, Norway, have invented certain new and useful Improvements in Timber-Gages; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

There have been constructed previously timber gages enabling at the same time a direct reading of the cubic volume of a log of timber and the measurement of its diameter. In these gages the cubic numbers corresponding to the various lengths of the log are located on a fixed scale provided on the rail portion of the gage. This is, however, objectionable in several respects. It is lengthy and troublesome to find out the proper cubic number of the scale, and erratic readings are very liable to be made. The object of the present invention is to avoid these inconveniences by mounting the cubing scale on a rotatable member preferably cylindrical, and adapted to be adjusted by turning it by hand relatively to the fixed edge of the gage in such a way that the cubic number to be read is located in the angle between the said fixed edge and the slidable gage arm.

A form of the invention is shown on the accompanying drawing in which Figure 1 is a side view of the gage, Fig. 2 a cross section on line 1—1 of Fig. 1; Fig. 3 shows the table division of the cylinder surface spread out and on a larger scale. Fig. 4 is an enlarged detail view of one end of the gage.

The gage is provided, as usual, with a fixed arm A and a slidable arm B, sliding with its handle portion C, along the division on the rail portion of the gage. The latter, however, is not formed, as usual, of a compact rail but comprises two support rails D and E, connecting the arm A with a detachable end piece F, and between said supporting beams is pivotally mounted a cylinder G, whose ends extend into notches provided respectively on the arm A and the end piece F. In order to reduce the weight of the cylinder, this may be made hollow. The same is provided, as shown, with a cubing division giving the cubic numbers corresponding on one side to the centimeter (or inch) division on the fixed supporting beam D and, on the other to the scale H with half-meter (or foot) divisions provided on one end of the cylinder to indicate the length of the timber.

The mode of operation is as follows:

Assuming the log to be measured is 18 half meters long, one turns the cylinder G until the line for 18/2 meters on the scale H comes opposite the edge of the supporting beam D. The adjustable arm B of the gage is thereupon adjusted in the usual way to the central diameter of the log. Assuming the diameter amounts to 22 centimeters, the corresponding cubic number 342 is read on the cylinder opposite the division number 22 on the supporting rail D, said member being then situated in the angle formed by handle portion C of the adjustable gage arm and the fixed rail D.

On the end piece F or elsewhere on the gage may be provided a stop spring I adapted to engage a notch on the cylinder so as to signal each line of division by which the cylinder is turned and at the same time to hold same in the adjusted position.

The arms of the gage and the two supporting beams may be made as usual of steel whereas the cylinder is made preferably of a lighter material.

Claims:

1. A timber gage designed for cube readings comprising a cylinder having a scale indicating the length of the timber and a corresponding cubing scale mounted thereon, a rail parallel to said cylinder having a diameter scale thereon, a gage arm fixed on said rail, and a gage arm slidable along said fixed rail and said cylinder.

2. A timber gage designed for cube readings comprising a fixed gage arm, a cylinder mounted in and rotatable relatively to said arm and having a scale indicating the length of the timber and a cubing scale mounted thereon, a rail parallel to said cylinder having a fixed diameter scale thereon, and a gage arm slidable along said fixed rail and embracing said rail and cylinder.

3. A timber gage for cube reading, comprising a gage arm, a pair of parallel supporting rails fixed therein at one end, an end piece detachably fixed to the other end of said rails, a cylinder journaled in said arm and end piece and having a scale extending around one end thereof indicating the length of the timber and a corresponding cubing scale extending longitudinally of the cylinder, a gage arm slidably mounted on the supporting rails and embracing the cylinder, said cylinder being rotatable to bring the rows of figures on the cubing scale and the corresponding figures of the length scale into close relation to a diameter scale on one of the supporting rails.

4. A timber gage for cube reading, comprising a gage arm, a pair of parallel supporting rails fixed therein at one end, an end piece detachably fixed to the other end of said rails, a cylinder journaled in said arm and end piece and having a scale extending around one end thereof indicating the length of the timber and a corresponding cubing scale extending longitudinally of the cylinder, a gage arm slidably mounted on the supporting rails and embracing the cylinder, said cylinder being rotatable to bring the rows of figures on the cubing scale and the corresponding figures of the length scale into close relation to a diameter scale on one of the supporting rails, and a spring actuated, longitudinally movable pin in said end piece adapted to engage one end of the cylinder to insure a stepwise angular movement of the latter.

In testimony that I claim the foregoing as my invention, I have signed my name in presence of two subscribing witnesses.

MAGNUS PAULSEN.

Witnesses:
M. E. GUTTORNSEN,
THOS. HERG.

Copies of this patent may be obtained for five cents each, by addressing the "Commissioner of Patents, Washington, D. C."